Patented June 9, 1925.

1,541,507

UNITED STATES PATENT OFFICE.

JUSTIN JEFFERY, OF CHICO, CALIFORNIA.

METHOD OF WELDING CAST IRON.

No Drawing.    Application filed December 26, 1922. Serial No. 609,137.

*To all whom it may concern:*

Be it known that I, JUSTIN JEFFERY, a citizen of the United States, residing at Chico, county of Butte, State of California, have invented certain new and useful Improvements in Processes of Welding Cast Iron; and I do declare the following to be a full, clear, and exact description of the same.

This invention relates to improvements in the welding art, and particularly to that method of welding known as electric arc welding, the principal object of my invention being to provide a process whereby cast iron electrodes may be used with this method of welding.

The advantages of electric arc welding over the oxy-acetylene torch method are many, and those in the profession realize, and need not be pointed out.

The only reason that the electric arc method is not more universally used is I believe that up to the present, as far as I am aware, it has been impossible to use cast iron as the welding electrode, and as cast iron is generally known to be the best metal for welding purposes whether for cast iron or steel, and it can be successfully used in the oxy-acetylene method of welding, this relatively cumbersome and expensive method is still largely adhered to.

The main reason why cast iron electrodes have not been successful is because the arc will not hold onto the bare rod and no appreciable amount of metal is drawn from the said electrode and deposited onto the part to be welded.

Steel electrodes are not thus affected and can be used, but cast iron when once applied is much harder and a weld of steel on cast iron is not satisfactory, the ultimate result for various reasons being a mere building up of metal on the part to be welded rather than a true weld.

My process contemplates the overcoming of the above named defective operation by causing the cast iron electrode to have a thin coating of steel for which the arc has affinity, without altering the composition of the main body of the electrode and from which the deposit of welding metal is drawn by the arc; and further by causing a vapor to emanate from about the heated end of the electrode and surround the arc, keeping the outside air from the weld, which excludes the nitrogen in the air, which retards combustion, from the welding point. I then liberate free oxygen inside the vapor immediately adjacent the welding area. This speeds up combustion and materially aids the passing of the electric current and generally increases the efficiency of the welding operation.

I carry out my process by coating the electrode by dipping or otherwise, with a composition containing those elements which when heated will cause the above named conditions to be effected, the ingredients in said composition being preferably those set forth in my copending application for patent on the same filed December 26th, 1922, Serial No. 609,138.

This composition contains chlorate of potash from which oxygen is liberated when heated and which unites with the carbon in the iron close to its surface to aid in transforming it to the mild steel coating above referred to.

The ingredients from which a vapor of the desired character emanates, for the purpose above referred to, are preferably iron oxide, borax, baking soda and burnt lime, certain of these ingredients having valuable fluxing properties.

Such a composition is easily applied to the electrode and I believe is the simplest way in which the process may be carried out, but I do not of course wish to limit myself to the use of the same, as there may be found to be other ways by which the electrode may be acted on to obtain the same necessary chemical or other reactions necessary to enable cast iron to be used as a welding electrode in the electric welding art.

With reference to the benefit derived from excluding the nitrogen in the atmosphere by the protecting vapor I have observed from experiments that the nascent oxygen from the chlorate of potash seems to be liberated in very good proportion. This speeds combustion to a point which raises the surface of the cast iron to such an extremely high heat that the carbon, which is often very hard to break up or penetrate, seems to change rapidly to a plastic state. The sulphur then rising out of the heated portions is speeding in its burning, and by the time the metal has cooled to a solid mass, most of the gases present have come to the surface and there is left a clear, clean and strong bond or fusion, which has marvelous wearing qualities and can stand terrific jarring or hammering.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A process of electric arc welding with cast iron as the welding electrode of the arc, consisting in causing a coating of mild steel to be formed and maintained on such electrode as the electric current passes therethrough.

2. A process of electric arc welding with cast iron as the welding electrode of the arc, consisting in forming a coating of mild steel on such electrode as the electric current passes therethrough, enveloping the arc in a gas to exclude atmospheric nitrogen, and liberating oxygen in quantity adjacent the arc to speed up combustion.

3. A process of electric arc welding with cast iron as the welding electrode, consisting in providing a thin coating of mild steel around such electrode as the current passes therethrough, and enveloping the arc in a gas vapor to exclude atmospheric nitrogen from the welding area.

4. The process of electric arc welding including liberating a vapor around the arc to exclude atmospheric nitrogen and liberating free oxygen immediately adjacent the arc to speed up combustion.

5. A process of electric arc welding with cast iron as the welding electrode consisting in heating such electrode in the presence of nascent oxygen.

6. The process of electric arc welding including heating a cast iron electrode in the presence of a composition containing potassium chlorate and a fluxing agent.

7. The process of electric welding including heating a cast iron electrode in the presence of an oxygen liberating agent, iron oxide and a purifying agent.

8. The process of electric welding including heating a cast iron electrode in the presence of potassium chlorate, iron oxide, borax, sodium bicarbonate, and lime.

9. The process of arc welding in which a cast iron welding electrode is used, such electrode being heated in the presence of potassium chlorate to liberate free oxygen to unite with the carbon adjacent the surface of the electrode and form a coating of mild steel about the electrode.

In testimony whereof I affix my signature.

JUSTIN JEFFERY.